G. C. WENZEL.
Apparatus for Molding Soap.

No. 152,056. Patented June 16, 1874.

Witnesses
Chas H. Smith
Harold Serrell

Inventor
George C. Wenzel
per Lemuel W. Serrell
Atty

UNITED STATES PATENT OFFICE.

GEORGE C. WENZEL, OF NEWBURG, NEW YORK, ASSIGNOR TO JESSE OAKLEY, OF NEW YORK CITY.

IMPROVEMENT IN APPARATUS FOR MOLDING SOAP.

Specification forming part of Letters Patent No. 152,056, dated June 16, 1874; application filed June 1, 1874.

*To all whom it may concern:*

Be it known that I, GEORGE C. WENZEL, of Newburg, in the county of Orange and State of New York, have invented an Improvement in Apparatus for Molding Soap, of which the following is a specification:

In the manufacture of transparent soap it is necessary to mold the same while in a heated state, and this has been attended with considerable expense, because single molds operated by hand were usually employed.

My invention relates to an apparatus in which the soap is kept hot as it passes from the soap-making kettle into the molds, and the molds are constructed in such a manner that a large number of cakes or balls can be molded at one time, and the soap will be kept in a heated state by steam heat up to the point of delivery to the molds. I remark that the materials employed for this transparent soap are such that the soap is injured by the direct contact therewith of either steam or water.

Figure 1:
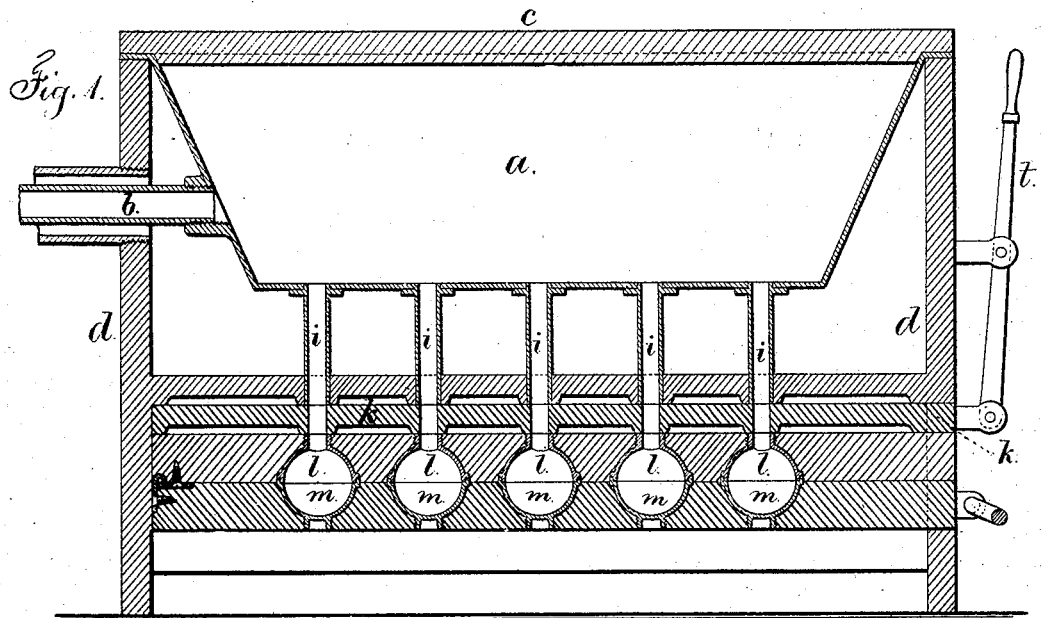
Figure 2:
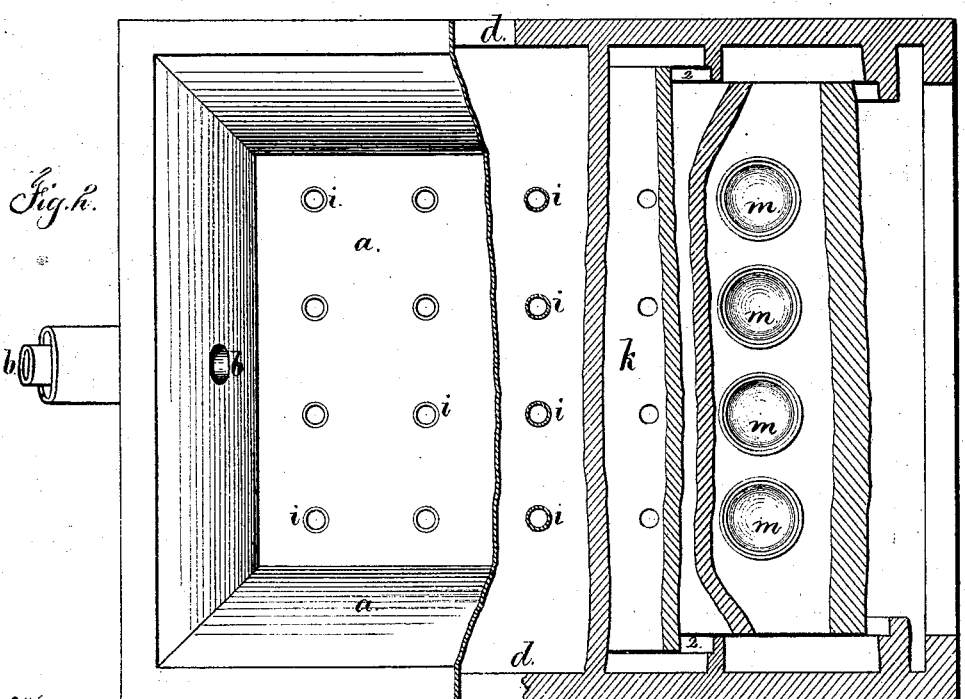

In the drawing, Figure 1 is a vertical section of my apparatus; and Fig. 2 is a plan, partially sectional, to represent the different portions of the devices employed.

The kettle $a$ forms a reservoir into which the soap is run from the soap-making kettle, through the pipe $b$, and this kettle $a$ is, preferably, made with a cover, $c$, and it is surrounded with a steam-jacket, $d$, which jacket also surrounds the supply-pipe $b$, so that the soap is kept in a melted condition. The tubes $i\ i$ pass from the bottom of the kettle $a$ through the steam-space of the jacket, and are open at both ends, and below their ends is a cut-off plate, $k$, that is sustained in guides 2 2, and pressed to the tubes by springs upon the ways or otherwise, and in the apparatus there is a space below the cut-off plate $k$ into which the divided molds $l\ m$ are inserted. These molds $l\ m$ are made in two parts, and the half cavities correspond in each, and there are suitable guides to hold the molds in their places one upon the other, and these molds are provided with spurs or filling-holes at their upper ends, positioned with reference to the tubes $i$ and holes in the cut-off plate $k$, so that they are in line with each other when the cut-off plate is moved to allow the soap to run into the molds, and the opening is closed by moving said cut-off plate by a lever, $t$, or otherwise, so as to retain the contents of the kettle $a$, while one set of molds is being removed and another substituted.

It will now be apparent that the soap is maintained in a heated or melted condition by steam admitted into the jacket $d$, and that the material cannot become chilled in the tubes conveying the same to the molds, and that the soap can be cast with great rapidity into the molds, and one set of molds can be removed and another substituted immediately, thus facilitating the manufacture and lessening the cost.

I claim as my invention—

The soap-kettle $a$, surrounded by the jacket $d$, and having the tubes $i\ i$ passing from the bottom of the kettle $a$ through the steam-space, in combination with the sliding cut-off plate $k$ and divided molds $l\ m$, as and for the purposes set forth.

Signed by me this 13th day of May, A. D. 1874.

GEORGE C. WENZEL.

Witnesses:
GEORGE G. WICKLEM,
FRANK G. WOOD.